Oct. 26, 1948.  G. H. STONER  2,452,335
TWO-AXIS RATE GYRO
Filed Dec. 26, 1945

INVENTOR.
GEORGE H. STONER
BY *Glenn Orlob*
AGENT

Patented Oct. 26, 1948

2,452,335

UNITED STATES PATENT OFFICE 2,452,335

TWO-AXIS RATE GYRO

George H. Stoner, Seattle, Wash., assignor to Boeing Airplane Company, a corporation of Delaware Application December 26, 1945, Serial No. 637,277

5 Claims. (Cl. 33—204)

My invention relates to a rate gyro system for aircraft or the like and consists of a single gyro unit which is capable of indicating angular rotation rates about two separate axes at right angles to each other.

The basic angular pick-up system generally used to provide a suitable reference for the automatic control of airplanes and other maneuverable vehicles involves a gyro wheel mechanically mounted with freedom of rotation about the center of gravity of the gyro. The mechanical embodiment of this mount invariably uses the gimbal ring support system which has a lock position through which the instrument cannot be carried without tumbling the gyro.

Angular rotation rate indicating gyros heretofore known require two fixed bearings for the gyro wheel and two fixed bearings for the gyro housing mount, along with spring restraining and damping means for the housing rotation. Despite this complexity, conventional rate gyros indicate rotation only about a single axis.

It is an object of this invention to provide a single light weight gyro unit adapted to simultaneously indicate angular rotation rates of a maneuverable vehicle about two separate axes at right angles to each other.

It is a further object of the instant invention to provide a simplified two-axis rate gyro utilizing for damping means the inherent properties of a self-aligning bearing which causes it to resist sudden changes in the axis of rotation.

It is also an object of this invention to provide a gyro wheel supported in two fixed bearings and mounted on a self-aligning bearing allowing free rotation about any axis within a cone of freedom about the bearing housing center line. A rate gyro of the type herein described is operable at any angular position when carried by an airplane or other maneuverable vehicle.

Other objects of the invention will appear from the following description taken in connection with the drawing, which forms a part of this specification, and in which.

Figure 1:
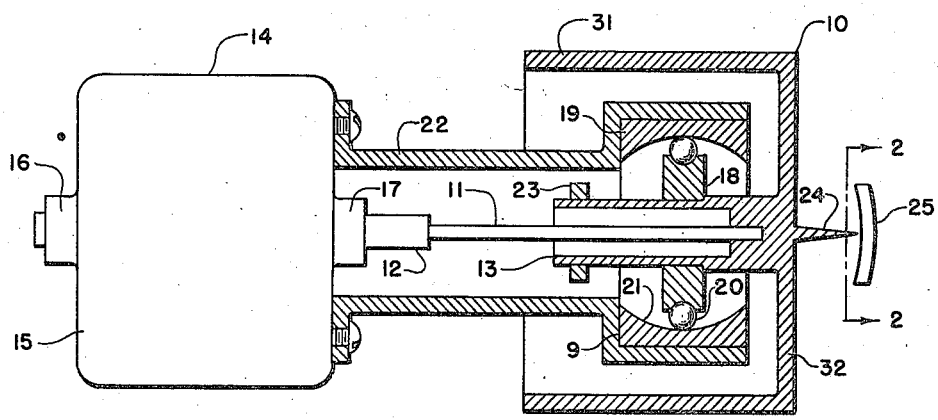
Figure 1 is a sectional view showing the preferred form of the invention.
Figure 2:
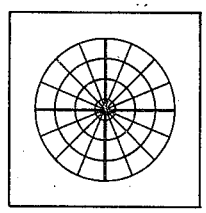
Figure 2 is a plan view of a preferred form of the fixed scale calibrated to indicate deviation of the gyro wheel from the reference position.

Referring to the drawing for more specific details of the invention, 10 represents a gyro wheel suitably coupled by the constraining means 11 to rotate with the rigid shaft 12 driven by the motor 14. The motor 14 is preferable electrically or pneumatically operated and has a fixed housing 15 supporting the rigid shaft 12 at opposite ends by means of the two fixed bearings 16 and 17. The constraining means 11 has low stiffness characteristics relative to the rigid shaft 12 and is preferably made integral therewith by reducing a portion of the rigid shaft 12 to a lesser diameter.

The gyro wheel 10 is preferably in the form of a cylinder 31 having one end closed by a disk portion 32 supporting an interior cylinder 13 so that the gyro wheel 10 is normally rotated by the constraining means 11 about an axis concentric with the common axis of the cylinder 10 and the inner cylinder 13. Supporting the inner cylinder 13 is the inner bearing member 18. The outer raceway for the series of balls 20 is the external bearing member 19 having a spherically ground internal bearing surface 21. The external bearing member 19 is fixedly supported by the cylindrical member 22 carried by the motor housing 15.

Also supported on the inner cylinder 13 is the balance weight 23. The location of the balance weight 23 on the inner cylinder 13 is selected so that the center of gravity of the gyro wheel 10 coincides with the center of rotation of the self-aligning bearing 9 formed by the inner bearing member 18, the external bearing member 19 and the balls 20.

Upon rotation of the constraining means 11 by the driving motor 14, the axis of rotation of the gyro wheel 10 tends to coincide with the axis of the rigid shaft 12. Damping action resisting angular rate of motion of the gyro spin axis is obtained by utilizing the inherent gyroscopic and frictional properties of the self-aligning bearing 9 which causes it to resist sudden changes in its axis of rotation.

As the two-axis rate gyro is rotated at constant angular velocity about any axis in the plane of the bearing housing, the spin axis of the gyro wheel 10 attains an equilibrium angular deflection with respect to the center line of the rigid shaft 12 in the plane common to the axis of rotation of the gyro wheel 10 and the rigid shaft 12. This angular deflection is proportional to the rate of rotation of the complete instrument about its center of rotation and is indicated by the position of the movable pointer 24 with respect to the fixed scale 25. The pointer 24 is supported by the gyro wheel 10 with the axis of the pointer 24 coinciding with the axis of the gyro wheel 10. The fixed scale 25 is preferably in the form of a spherical sector having graduations on its face in polar or rectangular coordinates which indicate the magnitude of the deviation of the gyro wheel 10 from the reference axis. While a pointer and scale form of indicator has been shown in the drawing, it is recognized that the instant invention can also be used in combination with photo-cells or other known types of pick-up units adapted to provide an indication of the angular deflection of the gyro axis.

The two-axis rate gyro herein described has a very high inherent zero stability because the constraining and damping means are being continuously rotated, thus averaging out any tendency to acquire a zero set. Individual indications of the rate gyro can therefore be integrated to provide an indication of absolute angular displacement from the reference axis in applications where angular rates of rotation are not desired. In such applications, a rate gyro with an extremely stable zero indication is highly desirable, since very small zero errors build up to very large errors for the integrated angle.

While the form of apparatus herein described constitutes a preferred embodiment of the invention, it is to be understood that the invention is not to be limited to this precise form of apparatus, and that changes may be made therein without departing from the scope of the invention which is defined in the appended claims.

I claim as my invention:

1. A rate gyro comprising a driving means including a housing and a shaft journaled therein, a gyro wheel having in interior cylindrical portion, a damping means supporting said interior cylindrical portion and adapted to allow free rotation of said gyro wheel about any axis within a cone of freedom about the axis of said shaft, a spring means connecting said gyro wheel with said shaft, and means operable to simultaneously indicate angular position of said gyro wheel axis with respect to two separate axes at right angles to each other.

2. A rate gyro comprising a driving means including a rotor shaft supported at more than one point by a housing having fixed bearings, a cylindrical gyro wheel including a self-aligning bearing providing for free rotation of said gyro wheel about any axis within a cone of freedom about the axis of said rotor shaft, said self-aligning bearing being adapted to resist sudden changes in the axis of rotation of said gyro wheel, an elongated resilient element connecting said shaft and said gyro wheel, and means operable to indicate the angular deflection of the spin axis of said gyro wheel with respect to the axis of rotation of said shaft.

3. A gyroscopic device comprising a support, a gyro wheel mounted on the support for universal motion within predetermined limits, driving means for the wheel comprising a resilient shaft resisting displacement of the axis of rotation of the wheel from a predetermined position relative to the support, and means for indicating the amount of such displacement.

4. A rate gyro comprising a driving means including a housing and a rigid shaft journaled at opposite ends by said housing, a cylindrical gyro wheel closed at one end by a disk portion supporting an interior cylinder concentric with the axis of said gyro wheel, said interior cylinder supporting a balance means for said gyro wheel and a self-aligning bearing having a fixed outer raceway supported on said housing, and a resilient means having less stiffness than said shaft and adapted to be driven by said shaft and to drive said gyro wheel, whereby said rate gyro is adaptable to simultaneously indicate angular rotation rates about two separate axes at right angles to each other.

5. A rate gyro comprising a driving means including a housing and a shaft journaled therein, a gyro wheel mounted on said housing for free rotation about any axis within a cone of freedom about the axis of the shaft, and a resilient rod connecting the gyro wheel with the shaft, whereby deflection of the spin axis of the gyro wheel with respect to said shaft is resiliently restrained and said deflection is an indication of the angular rotation rate of the housing about any axis perpendicular to the shaft.

GEORGE H. STONER.

REFERENCES CITED

The following references are of record in the file of this patent:

UNITED STATES PATENTS

| Number | Name | Date |
| --- | --- | --- |
| 1,860,230 | Brown | May 24, 1932 |
| 1,894,038 | Henderson | Jan. 10, 1933 |